(12) United States Patent
Baeuerle

(10) Patent No.: US 6,918,250 B2
(45) Date of Patent: Jul. 19, 2005

(54) METHOD FOR REGULATING THE SUPERCHARGING OF AN INTERNAL COMBUSTION ENGINE

(75) Inventor: Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/656,404

(22) Filed: Sep. 5, 2003

(65) Prior Publication Data

US 2004/0123850 A1 Jul. 1, 2004

(30) Foreign Application Priority Data

Sep. 18, 2002 (DE) .......................................... 102 43 268

(51) Int. Cl.$^7$ .......................... F02B 37/12; F02D 23/00
(52) U.S. Cl. ........................................ 60/602; 123/564
(58) Field of Search ............................. 60/602, 605.1, 60/611; 123/559.1, 564

(56) References Cited

U.S. PATENT DOCUMENTS

| | | | |
|---|---|---|---|
| 5,680,763 A | * 10/1997 | Unland et al. ................ | 60/602 |
| 5,867,986 A | * 2/1999 | Buratti et al. ................ | 60/602 |
| 6,148,615 A | 11/2000 | Vogt et al. ................... | 60/602 |
| 6,220,232 B1 | 4/2001 | Torno et al. ................. | 60/602 |
| 6,425,247 B1 | * 7/2002 | Schmid ....................... | 60/602 |
| 6,427,445 B1 | * 8/2002 | Isaac et al. .................. | 60/602 |
| 6,672,060 B1 | * 1/2004 | Buckland et al. ............ | 60/602 |
| 6,732,523 B2 | * 5/2004 | Birkner et al. ............. | 60/605.1 |

* cited by examiner

*Primary Examiner*—Sheldon J Richter
(74) *Attorney, Agent, or Firm*—Kenyon & Kenyon

(57) ABSTRACT

A method for regulating the supercharging of an internal combustion engine is provided, which method does not require adaptation offset. A manipulated variable is formed from the deviation between a setpoint value of an operating parameter of the internal combustion engine and an actual value of this operating parameter, the manipulated variable having at least one component supplied by an integral action controller. For the integral component, a limit value is specified which is determined from multiple operating parameters of the internal combustion engine. The limit value is adapted by adaptively determining a first of the operating parameters used for determining the limit value as a function of a second operating parameter.

16 Claims, 8 Drawing Sheets

METHOD FOR REGULATING THE SUPERCHARGING OF AN INTERNAL COMBUSTION ENGINE

FIELD OF THE INVENTION

The present invention relates to a method for regulating the supercharging of an internal combustion engine, and relates more particularly to a method in which a manipulated variable is produced from a deviation between a setpoint value of an operating parameter of the internal combustion engine and an actual value of this operating parameter, the manipulated variable having at least one component supplied by an integral action controller, and a limit value being specified for the integral component which is determined from multiple operating parameters of the internal combustion engine.

BACKGROUND INFORMATION

Published German Patent Application No. 197 12 861 describes a method for regulating the supercharging of an internal combustion engine, in which method a manipulated variable is generated from the deviation between a setpoint charge pressure and the actual charge pressure, the manipulated variable having at least one component supplied by an integral action controller, and a limit value being specified for the integral component which is determined from a base value which is in turn a function of multiple operating parameters of the internal combustion engine and from a correction value superimposed on this limit value. In addition, the correction value is adaptively determined as a function of the rotational speed, with multiple rotational speed ranges being specified. The adapted correction value is incrementally decreased when the deviation is less than a threshold and the integral component is less than the instantaneous limit value. The adapted manipulated variable is incrementally increased when the deviation is greater than zero and the integral component is greater than or equal to the instantaneous limit value.

The manipulated variable for the supercharger is composed of a proportional, a differential, and an integral component. The integral component is limited in the stationary as well as in the dynamic operation of the internal combustion engine. The limit value of the integral component in the dynamic operation is composed of a base value derived from characteristic curves as a function of operating parameters, and a correction value superimposed on the base value. The correction value is adapted as a function of the charge air temperature, the ambient pressure, and the rotational speed of the internal combustion engine.

A method for regulating the charge pressure of an internal combustion engine is also described in published German Patent Application No. 198 12 843 in which a manipulated variable for an actuator is generated from the deviation between a setpoint charge pressure and the actual charge pressure, the actuator acting on the exhaust gas stream supplied via the turbine of an exhaust gas turbocharger. The manipulated variable, or one or more other quantities forming the manipulated variable, in a characteristic map is (are) transformed into values such that at least approximately linear relationship exists between the manipulated variable and the controlled variable—the charge pressure—after the transformation.

The resulting characteristic of the charge pressure regulating system may be described by a straight line and an offset in the form of the base charge pressure. This base charge pressure is an undesired characteristic of the waste gate actuator common in a gasoline engine, for example, caused by the supply of excess pressure from the charge pressure. The base charge pressure is the lowest control threshold (0% pulse duty factor) of the charge pressure regulation for any given internal combustion engine, for example spark-ignition and diesel engines, and is modeled within the engine controller.

Previously, the adaptation values for the limit value have been formed in the form of an offset value on the pulse duty factor level. This adaptation offset is stored by filing in cells which are addressable via the engine rotational speed.

The task of the limitation of the integral component includes, among others, the prevention of controller-induced over-swing in the charge pressure. To this end, an applied manipulated variable requirement is determined as a function of the engine rotational speed and the relative setpoint charge pressure, which is equal to the absolute charge pressure minus the base charge pressure. In addition to the referenced adaptive correction, this pulse duty value is corrected using charge air temperature and warm-up interventions.

In this method, it is problematic that for charge pressure setpoint values below the base charge pressure the above-referenced adaptation offset is constantly output, which for strongly positive adaptation values may result in an excessively high upper limit for the integral component, with corresponding over-swings in the charge pressure.

SUMMARY OF THE INVENTION

The method according to the present invention provides the advantage that the limit value is adapted by adaptively determining a first of the operating parameters used for determining the limit value as a function of a second operating parameter. In this manner, the adaptation of the limit value is shifted from the level of the manipulated variable, for example the pulse duty, to the level of the first operating parameter, for example a controlled variable used for determining the limit value. Thus, the adaptation offset of the limit value may be eliminated, and the above-mentioned over-swing may be avoided.

It is advantageous if the first operating parameter is determined from a base value which is dependent on at least one third operating parameter of the internal combustion engine and from a correction value superimposed on this base value, the correction value being adaptively determined as a function of the second operating parameter. In this manner, it is possible to adapt the base value particularly easily and with little effort, and the adaptation may be limited to the correction value.

A further advantage lies in the fact that the adapted correction value is incrementally decreased when the deviation is less than the threshold and the integral component is less than the instantaneous limit value, and that the adapted correction value is incrementally increased when the deviation is greater than zero and the integral component is greater than or equal to the instantaneous limit value. When a correction value for the limit value of the integral component is thus formed, it is possible to avoid severe over-swings during the charge pressure regulation and to still achieve rapid transient response of the controller. Particularly for high-performance vehicles which are often driven in dynamic operation, the method according to the present invention produces an excellent regulating response for the charge pressure regulation due to the method's ability to adapt the limit value for the integral component of the manipulated variable. The method according to the present invention thereby provides reliable control of tolerances in the control circuit.

It is also advantageous that the base value of the limit value is derived as a function of the second operating parameter and a variable from a characteristic map which characterizes the instantaneous ambient conditions.

Experience has shown that pulse duty deviations in the charge region are attributable mainly to changes in the base charge pressure. These changes may be distinctly different depending on the engine rotational speed, so that an adaptation as a function of the rotational speed is useful.

DETAILED DESCRIPTION

Figure 1:
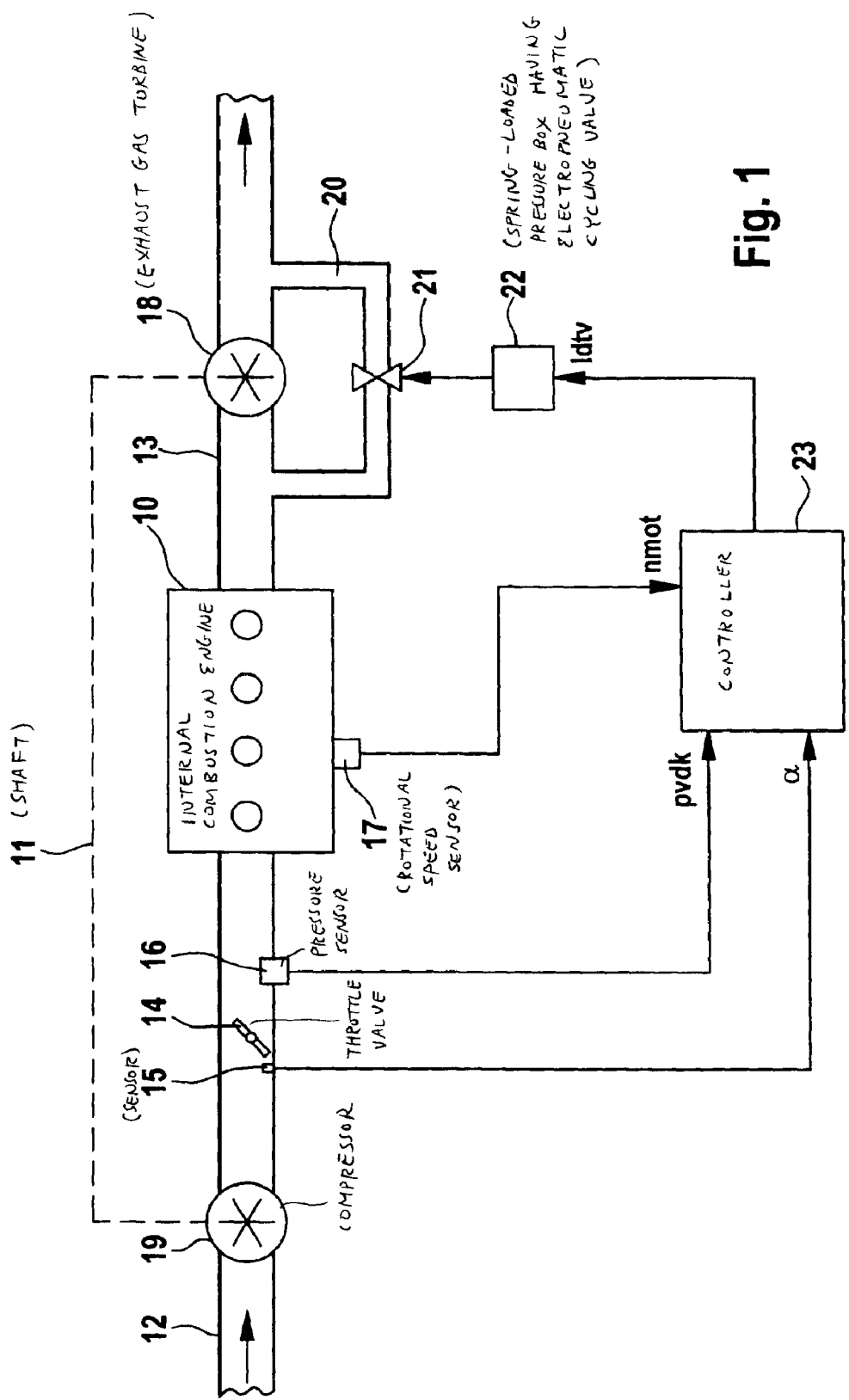
FIG. 1 shows a block diagram of an engine having charge pressure regulation.

FIG. 1 shows an internal combustion engine 10 having an intake pipe 12 and an exhaust duct 13. A throttle valve 14 and a sensor 15 for detecting aperture angle α of throttle valve 14 are situated in intake pipe 12. In addition, a pressure sensor 16 for detecting actual charge pressure pvdk is situated downstream from throttle valve 14. A rotational speed sensor 17 for detecting engine rotational speed nmot is attached to internal combustion engine 10. Internal combustion engine 10 is provided with a turbocharger, an exhaust gas turbine 18 being situated in exhaust duct 13 and a compressor 19 being situated in intake pipe 12. Compressor 19 is driven by a shaft 11 (indicated by a dashed line) of exhaust gas turbine 18. Exhaust gas turbine 18 is bypassed in a conventional manner by a bypass line 20 in which a bypass valve 21 is situated. Bypass valve 21 is actuated in a conventional manner by a spring-loaded pressure box connected to an electropneumatic cycling valve. The spring-loaded pressure box having the electropneumatic cycling valve is represented by block 22 in FIG. 1.

A controller 23 which receives throttle valve aperture angle α, measured actual charge pressure pvdk, and engine rotational speed nmot as input signals is described in greater detail below; it generates a manipulated variable ldtv for bypass valve 21. More precisely, manipulated variable ldtv controls the electropneumatic cycling valve as a pulse duration modulated signal, the electropneumatic cycling valve in turn generates the pressure for the spring-loaded pressure box, which in turn acts on the bypyass valve. The exhaust gas stream through turbine 18 may also be controlled by altering the turbine geometry.

One example of a controller 23 is described below with reference to FIGS. 2 through 6. The controller is implemented as a PID controller. However, any other type of controller may also be used.

Figure 2:
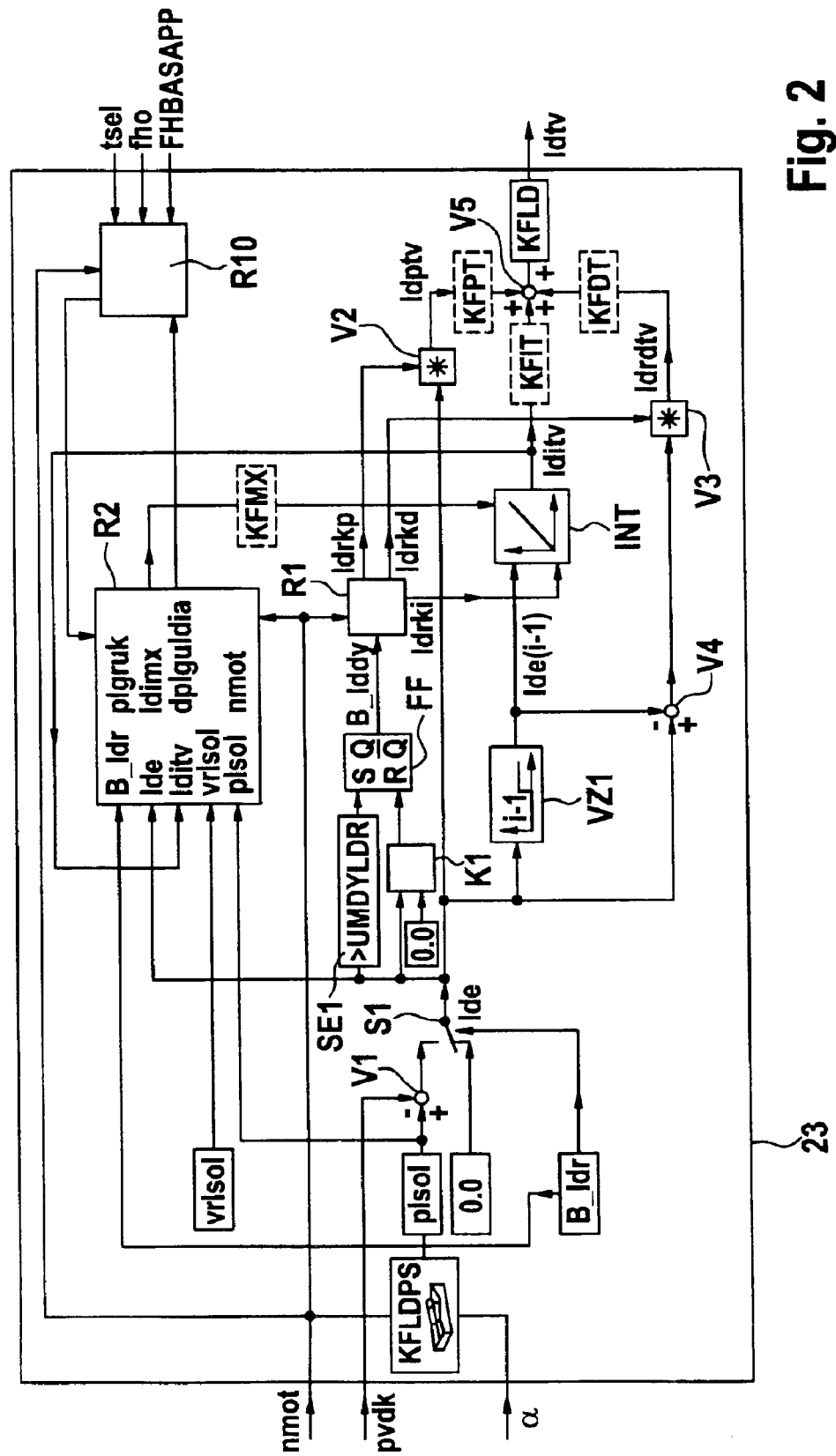
FIG. 2 shows a functional diagram of a charge pressure controller.

As shown in the functional diagram in FIG. 2, a setpoint charge pressure plsol is read from a characteristic map KFLDPS as a function of engine rotational speed nmot and throttle valve position α. In addition, actual charge pressure pvdk is measured by a pressure sensor upstream from the throttle valve. The difference between setpoint charge pressure plsol and actual charge pressure pvkd is determined in a node V1. This difference is designated as deviation lde. If condition B_ldr for actuation of the charge pressure regulation is present, a switch S1 is applied at the output of node V1 so that the above-mentioned difference between setpoint charge pressure plsol and actual charge pressure pvkd is present as deviation lde at the output of switch S1. If the charge pressure regulation is not active, i.e., condition B_ldr is not met, switch S1 has a position 0.0. Deviation lde is therefore zero in this case.

A threshold value decider SE1 applies a logical 1 to the S input of an RS flip-flop FF when deviation lde exceeds a threshold UMDYLDR. The R input of RS flip-flop FF is connected to the output of a comparator K1. This comparator K1 produces a logical 1 when deviation lde is less than or equal to 0.0. Under those conditions, a logical 1 is present at output Q of RS flip-flop FF when deviation lde exceeds threshold UMDYLDR, that is, a transition from stationary to dynamic operation occurs. If a logical 1 is present at the R input of RS flip-flop FF, that is, deviation lde is less than zero (the actual charge pressure is greater than the setpoint charge pressure), flip-flop FF is reset and a logical 0 is present at its output Q. Output signal B_lddy at the Q output of flip-flop FF indicates whether dynamic operation (logical 1) or stationary operation (logical 0) is present.

A proportional action controller parameter ldrkp, a differential action controller parameter ldrkd, and an integral action controller parameter ldrki are determined in function block R1 as a function of operating condition B_lddy and engine rotational speed nmot. The determination of action controller parameters ldrkp, ldrkd, and ldrki in function block R1 is described in greater detail below, with reference to FIG. 3.

The product of proportional action controller parameter ldrkp and deviation lde in multiplier V2 creates a proportional component ldptv for manipulated variable ldtv of the turbocharger.

A differential component ldrdtv of manipulated variable ldtv results in multiplier V3 from the product of differential action controller parameter ldrkd and the difference between instantaneous deviation lde and deviation lde(i−1) determined in the previous cycle (approximately 50 ms previously). The difference between instantaneous deviation lde and previously determined deviation lde(i−1) is calculated in node V4. A delay element VZ1 supplies deviation lde(i−1) which has been delayed by one cycle.

Integral component lditv of manipulated variable ldtv is formed by an integrator INT which calculates the product of integral action controller parameter ldrki and delayed deviation lde(i−1), and superimposes this product on integral component lditv(i−1) determined in the previous cycle.

Finally, proportional component ldptv, differential component ldrdtv, and integral component lditv are added in node V5, resulting in manipulated variable ldtv for a bypass valve of the turbocharger.

Integral component lditv has an upper-bound to avoid over-swing in the action controller of the charge pressure. Limit value ldimx for integral component lditv is determined in a switching unit R2, which is further described below with reference to FIG. 4, as a function of deviation lde, integral component lditv, setpoint charge pressure plsol, engine rotational speed nmot, and ratio vrlsol of the setpoint filling and the maximum filling of the cylinder.

Figure 3:
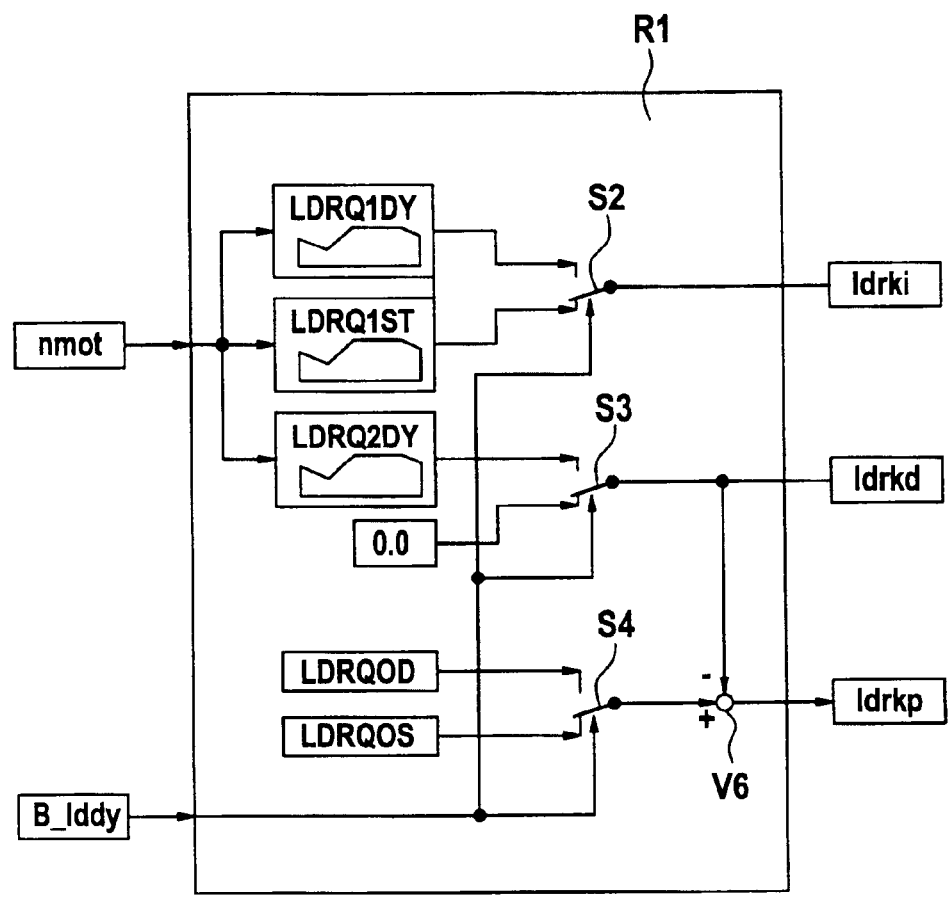
FIG. 3 shows a functional diagram for determining control parameters.

Function block R1 illustrated in FIG. 3 contains three characteristic maps LDRQ1DY, LDRQ1ST, and LDRQ2DY which depend on engine rotational speed nmot. If condition B-lddy for dynamic operation is present, integral action controller parameter ldrki from characteristic curve LDRQ1DY for dynamic operation is switched to the output by switch S2. Differential action controller parameter ldrkd is switched to the output by switch S3 from characteristic curve LDRQ2DY. Proportional action controller parameter ldrkp is produced in node V6 by subtracting a fixed value LDRQOD, switched by a switch S4 to node V6, from differential action controller parameter ldrkd. If condition B__lddy for dynamic operation is not present, and the engine is instead in stationary operation, integral action controller parameter ldrki is obtained from characteristic curve LDRQ1ST; accordingly, switch S2 is now connected to characteristic curve LDRQ1ST. Differential action controller parameter ldrkd is set at 0.0 via switch SR3, and proportional action controller parameter ldrkp is set at a fixed value LDRQOS by switch S4. Fixed values LDRQOD, LDRQOS, and characteristic curves LDRQ1DY, LDRQ1ST, and LDRQ2DY are determined by bench tests in such a way that the charge regulation is optimized in the dynamic and stationary operating states.

Figure 4:
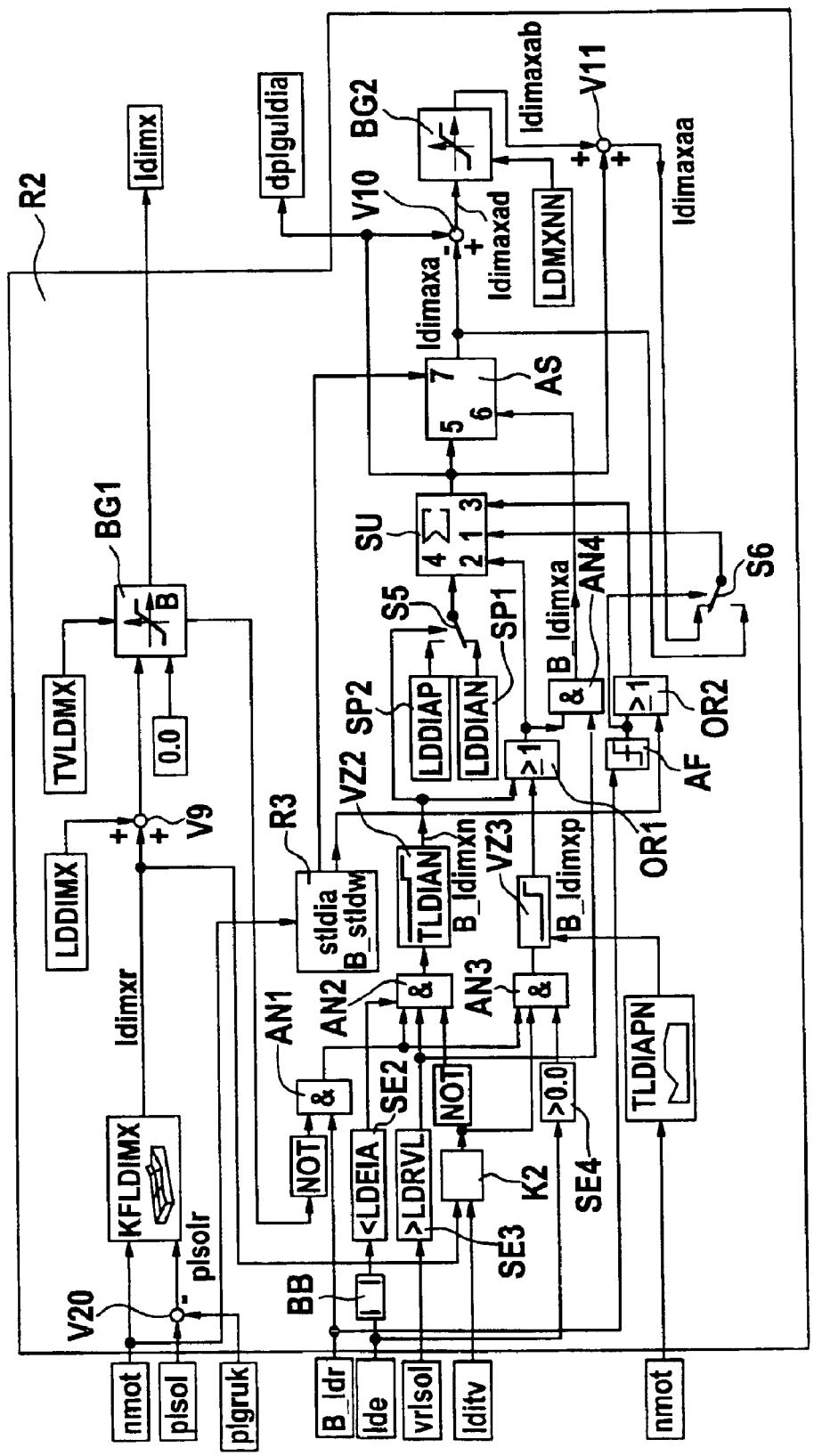
FIG. 4 shows a functional diagram for determining a limit value for an integral component of a charge pressure manipulated variable.

FIG. 4 illustrates function block R2, which derives limit value ldimx for integral component lditv from engine rotational speed nmot, setpoint charge pressure plsol, a corrected base charge pressure plgruk, deviation lde, ratio vrlsol of the setpoint filling to the maximum filling of the cylinder, and integral component lditv of the manipulated variable.

A relative setpoint charge pressure plsolr is composed of a base value, absolute setpoint charge pressure plsol, and a correction value plgruk, which is the corrected base charge pressure negatively superimposed on the absolute setpoint charge pressure in node V20. A pilot control value ldimxr of limit value ldimx is derived from a characteristic curve KFLDIMX as a function of rotational speed nmot and relative setpoint charge pressure plsolr. In addition, a fixed predetermined value LDDIMX may be added to pilot control value ldimxr in node V9. This value LDDIMX corresponds to a small fraction (approximately 0–5%) of limit value ldimx, which ensures that the value of LDDIMX does not fall below this small value under any circumstances. If the instantaneous integral component is greater than the limit value less value LDDIMX, which represents the safety margin, it is possible to spontaneously regulate the charge pressure without raising the limit value, provided that the charge pressure deviation to be adjusted does not cause any values greater than LDDIMX.

Using pilot control value ldimxr, it is possible to achieve a semi-pilot control in the form of a variable minimum and maximum limit of the integral component. The minimum and maximum limits are formed by additive correction using a fixed pulse duty ratio which has a negative deviation from pilot control value ldimxr for the minimum limit due to limit value LDDIMNN, and a positive deviation for the maximum limit due to limit value LDDIMXN, so that an operating range for the integral component is established about this pilot control value ldimxr within the minimum-maximum limit. In the example described with reference to FIG. 4, the maximum limit may be achieved by value LDDIMX, for example, resulting in limit value ldimx as the upper limit value for the integral component. Value LDDIMX then corresponds to limit value LDDIMXN for the maximum limit. Similarly, it is possible to form a lower limit value ldimn for the integral component by subtracting limit value LDDIMNN from pilot control value ldimxr, although this is not illustrated in the figures for the sake of clarity.

A limiting stage BG1 limits limit value ldimx to a specifiable value TVLDMX, which, for example, corresponds to 95% of the pulse duty of the manipulated variable for the charge pressure regulation.

An instantaneous correction value dplguldia for base charge pressure plgruk appears at the output of a totalizer SU. Under certain conditions, the correction value present at input 1 of this totalizer SU is either incrementally decreased or incrementally increased.

An incremental decrease in the correction value to take place in totalizer SU occurs under the following conditions:

The charge action controller is active; in other words, condition B__ldr is set, and instantaneous limit value ldimx is not at either the upper or lower end of limiting stage BG1. Both information items are present at the inputs of an AND gate AN1 which sends a logical 1 to a further AND gate when the two referenced conditions are met. An additional condition is that the absolute value of deviation lde be less than a threshold LDEIA. To this end, deviation lde is fed to an absolute value generator BB and then to a threshold value decider SE2 which at its output delivers a logical 1 to AND gate AN2 when the absolute value of deviation lde is below threshold LDEIA. This threshold LDEIA is approximately zero.

In addition, a threshold value decider SE3 checks whether ratio vrlsol of the setpoint filling to the maximum filling of the cylinder is above a threshold LDRVL. If this is the case, the engine operates at full load, and threshold value decider SE3 sends a logical 1 to an input of AND gate AN2.

The last condition to be met is that integral component lditv be less than limit value ldimx. Accordingly, a comparator K2 compares integral component lditv of the manipulated variable to limit value ldimx upstream from node V9. A logical 1 appears at the output of comparator K2 when integral component lditv is greater than pilot control value ldimxr. The output signal of comparator K2 arrives at an input of AND gate AN2 via an inverter NOT. Thus, a logical 1 is present at this input of AND gate AN2 when integral component lditv is less than limit value ldimx.

When all of the above-mentioned conditions have been met, a logical 1 is present at the output of AND gate AN2. This condition B__ldimxn for a negative incremental compensation of the correction value in totalizer SU is delayed in a delay element VZ2 by a fixed debouncing time TLDIAN at a switch S5, and is supplied to an OR gate OR1. If condition B__ldimxn for a negative incremental compensation of the correction value is specified, switch S5 connects input 4 of totalizer SU to a read-only storage SP1 in which increment LDDIAN for the negative compensation of the correction value is stored. If condition B__ldimxn is not met (corresponding to a logical 0 at the output of AND gate AN2), switch S5 switches to a memory SP2 in which increment LDDIAP for a positive compensation of the correction value is stored.

The following three conditions are met for an incremental positive compensation of the correction value:

As previously described for the negative incremental compensation, a logical 1 is present at the output of AND gate AN1.

In addition, deviation lde is greater than 0, a very small deviation from 0 being sufficient. A threshold value decider SE4 produces a logical 1 at its output when this condition is met.

Finally, instantaneous integral component lditv of the manipulated variable is greater than instantaneous limit value ldimx. As previously described, this condition is checked by comparator K2.

The output of this comparator K2 as well as the output of threshold value decider SE4 and the output of AND gate AN1 are present at an AND gate AN3. A logical 1 is present at the output of the latter when the three previously mentioned conditions are met.

The output signal of AND gate AN3, which is condition B_ldimxp for the incremental positive compensation of the correction value, is supplied via a delay element VZ3, whose delay time is equal to a debouncing time obtained from a characteristic curve TLDIAPN which is a function of engine rotational speed nmot. Condition B_ldimxn for the negative incremental compensation of the correction value and condition B_ldimxp for the positive incremental compensation are both present at the inputs of OR gate OR1. The output signal of this OR gate which is present at input 2 of totalizer SU signals to totalizer SU whether a positive or negative incremental compensation for the correction value present at input 1 of this OR gate should be performed.

Correction value dplguldia present at the output of totalizer SU is also fed to an input 5 of a function block AS in which the correction value is adapted. This adaptation is not carried out unless the engine is operating at full load and the condition for a positive or negative incremental compensation of the correction value is met. Information on full load operation can be retrieved at the output of above-mentioned threshold value decider SE3. Information on whether a positive or negative incremental compensation takes place may be obtained from the output signal of OR gate OR1. The output signal from threshold value decider SE3 as well as the output signal from OR gate OR1 are fed to the inputs of an AND gate AN4. When the two referenced conditions are met, output signal B_ldimxa of AND gate AN4 is a logical 1. Condition B_ldimxa for an adaptation of the correction value is present at input 6 of function block AS. Whenever condition B_ldimxa=1 applies, the instantaneous value from totalizer SU is accepted in a corresponding memory cell of function block AS in which numerous values simulating an adaptation characteristic curve are stored.

Interpolation points stldea for the adaptation of the correction value in function block AS are delivered from a function block R3. Function block R3 also supplies information B_stldw on change of interpolation points.

Either adapted correction value ldimxa from the output of function block AS or an adapted correction value ldimxaa is fed to an input 1 of totalizer SU for the formation of correction value dplguldia, in which jumps occurring in the negative direction have been limited to a minimum value. The selection between adapted correction value ldmixa and limited adapted correction value ldimxaa is made using a switch S6. Switch S6 switches to non-limited adapted correction value ldimxa when the charge pressure action controller is first activated, that is, immediately after appearance of a rising edge of condition B_ldr for the charge pressure action controller. The rising edge of signal B_ldr detects a flip-flop AF. Otherwise, switch S6 is in the other position and feeds limited adapted correction value ldimxaa to input 1 of totalizer SU.

One input 3 of totalizer SU receives information from the output of an OR gate OR2 as to whether a rising edge of charge pressure activation signal B_ldr is present or whether signal B_stldw indicates a change in interpolation points in function block R3.

Limited adapted correction value ldimxaa is formed as follows. Instantaneous correction value dplguldia sent from totalizer SU in a node V10 is subtracted from adapted correction value ldimxa present at the output of function block AS. Differential signal ldimxad is fed to limiting stage BG2. Limiting stage BG2 limits negative jumps of differential signal ldimxad to a predetermined limit value LDMXNN. Limited differential signal ldimxab at the output of limiting stage BG2 is added to instantaneous correction value dplguldia in node V11, ultimately producing limited adapted correction value ldimxaa.

Figure 7:
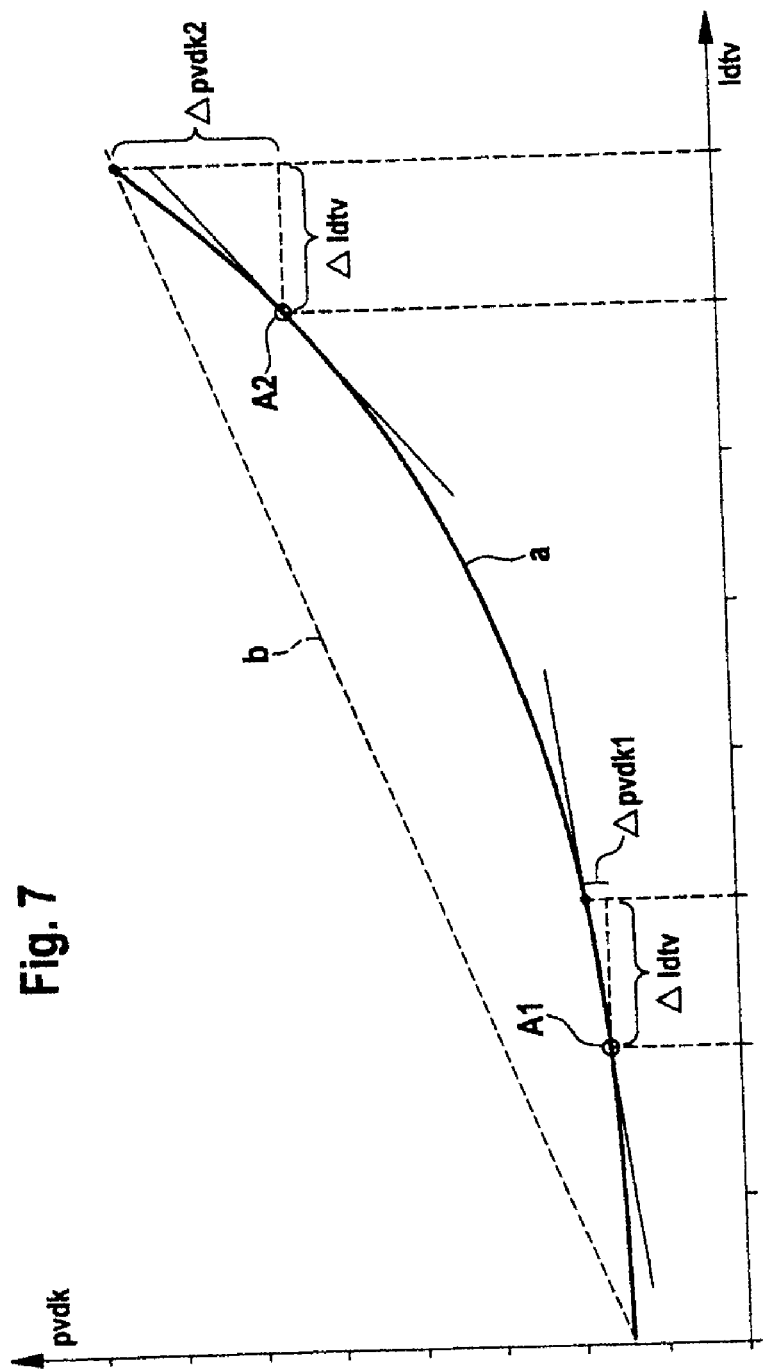
FIG. 7 shows a characteristic control curve.

FIG. 7 illustrates a course "a" of a regulating characteristic curve. The characteristic curve shows the dependence of the controlled variable (of charge pressure pvdk) on manipulated variable ldtv. Characteristic curve a normally has a nonlinear course which is caused primarily by the actuator, which has an electropneumatic cycling valve, a spring-loaded pressure box which actuates it, and the bypass valve actuated by the pressure box. Due to its nonlinearity, characteristic curve a has different slopes at operating points A1 and A2 which are situated farther apart, as indicated in FIG. 7. If, for example, the controller were set at operating point A1, a change of Δldtv in the manipulated variable would result in a change Δpvdk1 of 40 millibars in the charge pressure. If the operating point were now shifted to A2, the same change Δldtv in the manipulated variable would result in a significantly greater change Δpvdk2 of approximately 220 millibars in the charge pressure. Thus, a shift in the operating point from A1 to A2 would cause an over-swing of approximately 180 millibars in the charge pressure action controller. Such an undesired effect may be avoided by transforming nonlinear characteristic curve a into a linear characteristic curve "b". For a linear characteristic curve b, a change of Δldtv in manipulated variable ldtv would result in the same change in the charge pressure.

The regulating characteristic curve may be linearized by the following measures:

As shown in FIG. 2, manipulated variable ldtv is supplied to a characteristic map KFLD at the output of node V5. In this characteristic map KFLD, for each possible operating point the manipulated variable determined by the controller is transformed into a value such that a linear relationship results between the transformed values of manipulated variable ldtv and charge pressure pvdk. The transformation values derived from known nonlinear characteristic curve "a" during calibration of the controller are stored in characteristic map KFLD so that during normal operation of the controller it is possible to associate each calculated value of the manipulated variable with a corresponding transformed value.

Instead of characteristic map KFLD for the transformation of manipulated variable ldtv, proportional component ldptv routed to manipulated variable ldtv may also be transformed in a characteristic map KFPT, and/or differential component ldrdtv may be transformed in a characteristic map KFDT, and/or integral component lditv may be transformed in a characteristic map KFIT. All characteristic maps KFPT, KFDT, and KFIT may also be combined. Also, in addition to the above-mentioned characteristic maps, characteristic map KFLD may be present for resulting manipulated variable ldtv. Another alternative is to transform maximum value ldimx for integral component lditv in a characteristic map KFMX. Listed characteristic maps KFLD, KFPT, KFDT, KFIT, and KFMX may be provided alone or in combination with other characteristic maps; in each case they are applied so that at least approximately linear relationship results between manipulated variable ldtv and charge pressure pvdk.

Interpolation points stldea for adapting the correction value in function block AS are supplied by a function block R3, which is further described below with reference to FIG. 6. Function block R3 also supplies information B_stldw on changes in interpolation points.

Figure 6:
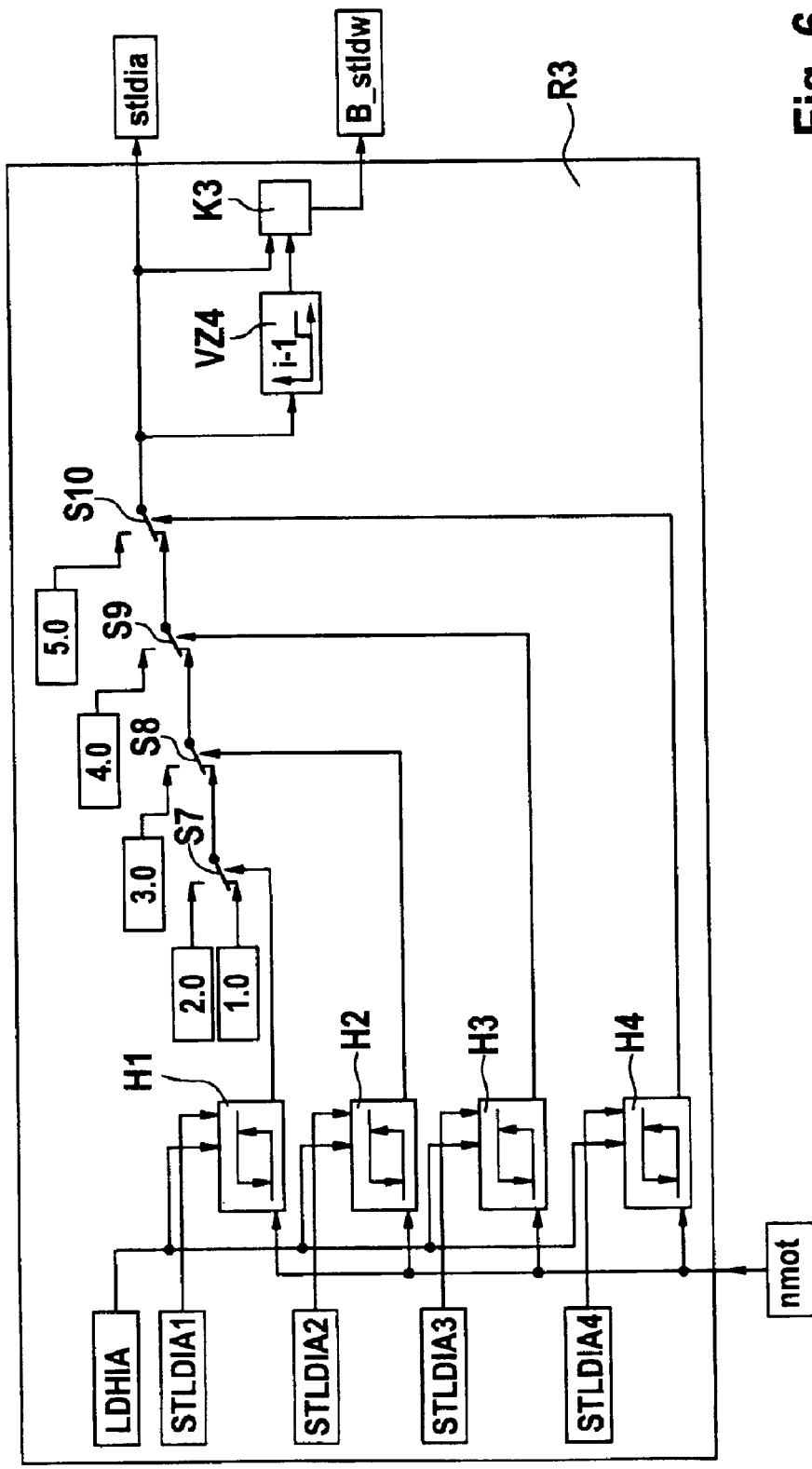
FIG. 6 shows a functional diagram for adaptation of the correction value as a function of the rotational speed.

FIG. 6 shows how interpolation points sdldea, which are supplied to function block AS for adaptation at input 7, are formed. According to one implementation, four circuits H1, H2, H3, and H4 generating hysteresis are provided. A hysteresis constant LDHIA present at all circuits H1 through H4 specifies the hysteresis width. The hystereses of four circuits H1 through H4 are distributed with respect to engine rotational speed nmot in such a way that each hysteresis covers one of four rotational speed ranges. This rotational speed-dependent position of the individual hystereses is predetermined for individual hysteresis circuits H1 through H4 by constants STLDIA1, STLDIA2, STLDIA3, and STLDIA4. Depending on which of the four rotational speed ranges instantaneous rotational speed nmot is situated in, a signal is sent from the output of hysteresis circuit H1 or H2 or H3 or H4. Each of the output signals controls a circuit S7, S8, S9, or S10. Interpolation points 1.0, 2.0, 3.0, 4.0, and 5.0 are present at the inputs of switches S7, S8, S9, and S10. Depending on the circuit position, that is, as a function of instantaneous rotational speed range nmot, one of the five interpolation points is connected as output signal stldia and reaches input 7 of adaptation circuit AS. Depending on the size of interpolation point stldea, the slope of the adaptation characteristic curve increases or decreases; adapted correction value ldimxa thus becomes greater or smaller as a result of the adaptation.

In hysteresis circuits H1 . . . H4, there is a right-hand switching point STLDIA1 . . . 4 and a left-hand switching point STLDIA1 . . . 4-LDHIA. As the rotational speed increases, that is, when nmot$\geq$STLDIA1 . . . 4, the output of affected hysteresis circuit H1 . . . H4 is switched to "1." The output is then reset to "0" when nmot$\leq$STLDIA1 . . . 4-LDHIA.

Information on the change in interpolation points B_stdlw is obtained using a comparator K3. This comparator compares instantaneous interpolation point value stldia to interpolation point value stldia(i−1) determined in the previous cycle. A delay element VZ4 provides previous interpolation point stldia(i−1) for comparator K3. If the two interpolation point values stldia and stldia(i−1) present at the inputs of comparator K3 differ from one another, comparator K3 supplies information on a change in interpolation point B_stdlw at its output.

Correction value dplguldia determined in switching unit R2 is fed to a further switching unit R10, as illustrated in FIG. 2. Switching unit R10 determines corrected base charge pressure plgruk from correction value dplguldia, engine rotational speed nmot, an intake air temperature tsel, a calibration elevation FHBASAPP above sea level, and an instantaneous elevation fho of internal combustion engine 10 above sea level. This base charge pressure is in turn fed to switching unit R2, where it is subtracted from setpoint charge pressure plsol in node V20, as described, to produce relative setpoint charge pressure plsolr.

Figure 5:
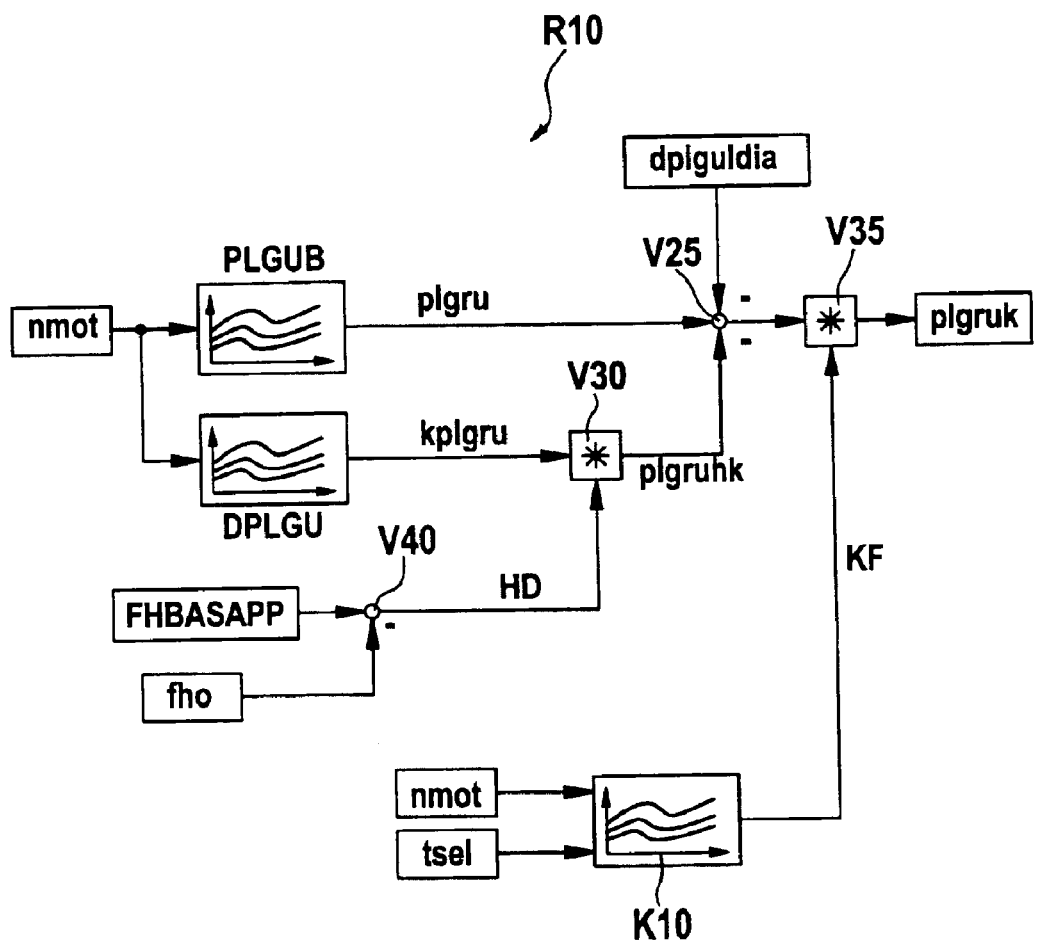
FIG. 5 shows a functional diagram for determining a correction value for a first operating parameter.

The design and operating mode of switching unit R10 are described with reference to the function diagram according to FIG. 5. Base charge pressure plgru is determined at calibration elevation FHBASAPP as a function of engine rotational speed nmot according to a characteristic curve PLGUB. Characteristic curve PLGUB was previously adapted to an engine bench test, for example, at calibration elevation FHBASAPP. Calibration elevation FHBASAPP may be close to sea level, for example. Base charge pressure plgru denotes the minimum obtainable charge pressure for a fully open throttle valve having a pulse duty factor of 0% as the manipulated variable, which indicates the lower control limit of the regulating system.

Using an additional characteristic curve DPLGU, a correction base charge pressure kplgur based on calibration elevation FHBASAPP is calculated from engine rotational speed nmot, and the correction base charge pressure when multiplied by instantaneous elevation difference HD between instantaneous elevation fho and calibration elevation FHBASAPP describes the change in base charge pressure plgru with elevation. Characteristic curve DPLGU may provide correction base charge pressure kplgru up to, for example, an elevation difference HD of approximately 2500 meters. Instantaneous elevation difference HD is determined in a node V40 by subtracting instantaneous elevation fho from calibration elevation FHBASAPP. Instantaneous elevation difference HD is then multiplied by correction base charge pressure kplgru in a node V30. This results in a base charge pressure plgruhk corrected for elevation. Correction base charge pressure kplgru is negative, so that for instantaneous elevations fho greater than calibration elevation FHBASAPP a positive base charge pressure plgruhk is obtained, which is corrected for elevation. For instantaneous elevations fho less than calibration elevation FHBASAPP, negative base charge pressures plgruhk corrected for elevation are correspondingly obtained. Base charge pressure plgruhk corrected for elevation and correction value dplguldia are then subtracted from base charge pressure plgru in a node V25. Correction value dplguldia thus represents a correction base charge pressure necessary for adapting limit value ldimx. In addition, the result of subtraction in node V25 may optionally be multiplied by a correction factor KF in a node V35 to take temperature effects into account. Correction factor KF is determined from a characteristic map K10 as a function of engine rotational speed nmot and intake air temperature tsel. Corrected base charge pressure plgruk is then present at the output of node V35.

Limit value ldimx now is no longer adapted by adding directly to pilot control value ldimxr as a pulse duty factor offset, but rather by subtracting in the form of offset or correction value dplguldia from base charge pressure plgru.

As an example, slightly positive correction value dplguldia reduces calculated base charge pressure plgru, so that an increasing relative setpoint charge pressure plsolr is calculated. This increasing relative setpoint charge pressure plsolr causes pilot control value ldimxr to increase in characteristic map KFLDIMX. A subsequent direct correction of pilot control value ldimxr using an adaptation value is now omitted, so that for transient adaptation, limit value ldimx then still corresponds to manipulated variables or pulse duty factor requirement lditv of the integral component of the controller.

Figure 8:
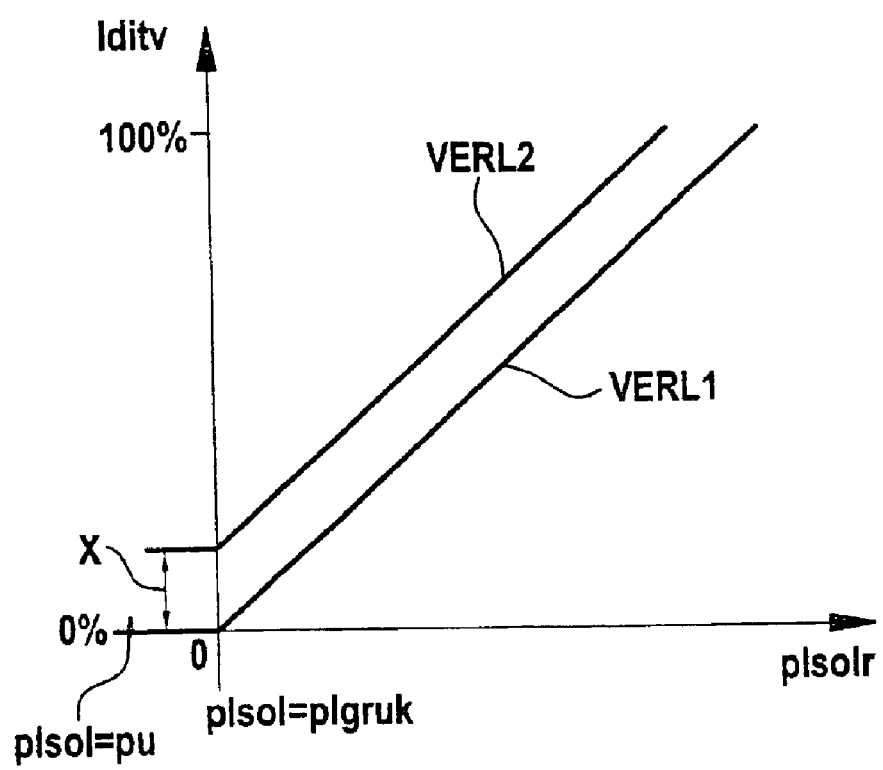
FIG. 8 shows a curve of an integral component over a relative setpoint charge pressure.

FIG. 8 illustrates the curve of integral component lditv as a function of relative setpoint charge pressure plsolr. According to the method of the present invention, ideal curve VERL1 is obtained, taking into account the subsequent linearization of the regulating characteristic curve described above according to FIG. 7, without offsetting the pulse duty factor, which would result in characteristic curve VERL2 being shifted upwards by X.

For relative setpoint charge pressures plsolr less than or equal to zero, that is, for absolute charge pressures less than or equal to corrected base charge pressure plgruk, the pulse duty factor obtained is ideally 0% for integral component lditv. This is also true, for example, for an absolute setpoint charge pressure plsol corresponding to an ambient pressure pu which is less than corrected base charge pressure plgruk.

In this example, the setpoint value of an operating parameter is represented by the setpoint charge pressure, the actual value of the operating parameter is represented by the actual charge pressure, the first operating parameter is also represented by the setpoint charge pressure, the second operating parameter is represented by the engine rotational speed, and the third operating parameter is represented by the throttle valve setting, and the variable characterizing the instantaneous ambient conditions is represented by the intake air temperature and/or the instantaneous elevation of the internal combustion engine.

Of course, other variables besides those described may be used to implement the present invention.

What is claimed is:

1. A method for regulating a supercharge of an internal combustion engine, comprising:

generating a manipulated variable from a deviation between a setpoint value of an operating parameter of the internal combustion engine and an actual value of the operating parameter, the manipulated variable having at least one integral component supplied by an integral action controller;

specifying at least one limit value for the integral component, the at least one limit value being determined from a plurality of operating parameters of the internal combustion engine; and adapting the at least one limit value by adaptively determining a first operating parameter of the plurality of operating parameters as a function of a second operating parameter.

2. The method of claim 1, wherein a fixed quantity which is approximately 0–5% of an upper threshold of the manipulated variable is added to the at least one limit value.

3. The method of claim 1, wherein the first operating parameter is determined from a base value which depends on at least a third operating parameter of the internal combustion engine and a correction value superimposed thereon, the correction value being adaptively determined as a function of the second operating parameter.

4. The method of claim 3, wherein a fixed quantity which is approximately 0–5% of an upper threshold of the manipulated variable is added to the at least one limit value.

5. The method of claim 3, wherein the correction value is derived from characteristic maps as a function of the second operating parameter and a variable which characterizes instantaneous conditions of the internal combustion engine.

6. The method of claim 5, wherein a fixed quantity which is approximately 0–5% of an upper threshold of the manipulated variable is added to the at least one limit value.

7. The method of claim 3, further comprising:

limiting, to a maximum value, jumps in the adapted correction value in a negative direction that occur during a change from a first range of the second operating parameter to a second range of the second operating parameter; and removing the maximum value directly after a charge pressure action controller is activated.

8. The method of claim 7, wherein a fixed quantity which is approximately 0–5% of an upper threshold of the manipulated variable is added to the at least one limit value.

9. The method of claim 7, wherein the correction value is derived from characteristic maps as a function of the second operating parameter and a variable which characterizes instantaneous conditions of the internal combustion engine.

10. The method of claim 3, further comprising:

incrementally decreasing the adapted correction value when the deviation is less than a threshold value and the integral component is less than a current value of the at least one limit value; and incrementally increasing the adapted correction value when the deviation is greater than zero and the integral component is one of greater than or equal to the current value of the at least one limit value.

11. The method of claim 10, wherein the adapted correction value is not incrementally decreased unless the engine is operating at full load and the current value of the at least one limit value of the integral component is not at a lower threshold of the manipulated variable.

12. The method of claim 10, wherein the adapted correction value is not incrementally increased unless the current value of the at least one limit value of the integral component is not at an upper threshold of the manipulated variable.

13. The method of claim 10, wherein a fixed quantity which is approximately 0–5% of an upper threshold of the manipulated variable is added to the at least one limit value.

14. The method of claim 10, wherein the correction value is derived from characteristic maps as a function of the second operating parameter and a variable which characterizes instantaneous conditions of the internal combustion engine.

15. The method of claim 10, further comprising:

delaying at least one of the incremental increase and decrease of the adapted correction value by a debouncing time after conditions for at least one of the incremental increase and decrease of the adapted correction value are met.

16. The method of claim 15, wherein the debouncing time for the decrease of the adapted correction value is a fixed, predetermined value, and wherein the debouncing time for the increase of the adapted correction value is obtained from a characteristic curve which is a function of the second operating parameter.

* * * * *